United States Patent [19]

Lowther

[11] Patent Number: 4,958,653
[45] Date of Patent: Sep. 25, 1990

[54] DRAG REDUCTION METHOD FOR GAS PIPELINES

[75] Inventor: Frank E. Lowther, Plano, Tex.

[73] Assignee: Atlantic Richfield Company, Los Angeles, Calif.

[21] Appl. No.: 471,584

[22] Filed: Jan. 29, 1990

[51] Int. Cl.$^5$ .............................................. F17D 1/17
[52] U.S. Cl. ...................................................... 137/13
[58] Field of Search ......................................... 137/13

[56] References Cited

U.S. PATENT DOCUMENTS

| | | |
|---|---|---|
| 2,958,205 | 11/1960 | McConkey . |
| 3,307,567 | 3/1967 | Gogarty et al. ........................ 137/13 |
| 3,618,624 | 11/1971 | Vairogs . |
| 3,689,238 | 9/1972 | Stedman . |
| 3,736,288 | 5/1973 | Stratta et al. . |
| 4,132,535 | 1/1979 | Rivers et al. . |
| 4,310,335 | 1/1982 | Arnaudeau . |
| 4,325,397 | 4/1982 | Lofquist . |
| 4,325,581 | 7/1985 | Motier . |
| 4,325,712 | 4/1982 | Arnaudeau . |
| 4,722,363 | 2/1988 | Allyn ................................ 137/13 X |

OTHER PUBLICATIONS

Fundamentals of ipeline Engineering, Vincent-Genod, Gulf Publishing Co., Houston, Tex, 1984, pp. 164 et sec.
"Flow of Natural Gas Through Experimental Pipe Lines and Transmission Lines", Monograph 9, Bureau of Mines, American Gas Association, N.Y., N.Y., 1956.

Primary Examiner—Alan Cohan
Attorney, Agent, or Firm—Drude Faulconer

[57] ABSTRACT

A method of reducing drag (friction) of a gas (e.g. natural gas) flowing in a gas pipeline at a constant pressure drop between a first point and a second point. The gas flowrate is monitored at the second point as a drag reducer is injected into the gas flow at the first point. The injection rate of the drag reducer is adjusted to provide the maximum flowrate at the second point with the minimum amount of drag reducer. The excess drag reducer is removed from the gas flow at the second point and monitored. Once the maximum flowrate is stabilized, the injection rate of the drag reducer is adjusted to approximately the same rate as any excess drag reducer is being removed at said second point.

10 Claims, 1 Drawing Sheet

DRAG REDUCTION METHOD FOR GAS PIPELINES

DESCRIPTION

1. Technical Field

The present invention relates to a method for reducing drag in gas pipelines and in one of its preferred aspects, relates to a method for adding a drag reducer to a flowing gas pipeline to increase the flow rate therethrough.

2. Background Art

Fluids, such as crude oil and natural gas, are routinely transported through pipelines which may extend over long distances. It is well known that friction or "drag" between the fluids and the pipe wall causes substantial pressure drops along such pipelines as the fluids flow therethrough. To compensate for these pressure losses, pump and/or compressor stations are spaced along the pipeline to boost the pressure of the flowing fluids back to or near their original values in order to keep the fluid flowing at the desired flowrates and to insure that they will ultimately reach their destination.

Due to the high costs associated with installing, maintaining, and operating each booster station, economics dictate that the size and number of such stations for any particular pipeline is limited even though the actual throughput or flowrate may wind up being substantially less than the pipeline could otherwise carry. Since the size and number of booster stations are normally fixed at the time the pipeline is constructed, other techniques have been proposed to increase the maximum flowrate (i.e. volume) of fluids which can be carried through a pipeline at a constant pressure drop in the line.

One such known technique proposed for this purpose involves reducing the friction or drag of the fluids within the pipeline. The term "drag reduction", as recognized in the art, is the increase in the volumetric flowrate of a fluid at a constant pressure drop due to the addition of a material known as a "drag reducer" or "drag reducing agent" to the flowing fluids. Studies have shown that the drag experienced by flowing fluids in a pipeline is directly related to the "roughness" of the inner wall of the pipeline. Roughness is caused by the microscopic and/or larger pits, scratches, and other imperfections in the pipe wall which results during the manufacture of the pipe or from corrosion, abrasion, etc. of the pipe during use. It has been found that the rougher the pipe wall, the more friction or drag flowing fluids will encounter in the pipeline.

It is believed that drag reducers, when added to flowing fluids, provide individual molecules which affix to the wall of the pipe to "fill" the pits, etc., thereby smoothing out the roughness of the wall and reducing the drag (friction) between the wall and the fluids. Drag reducers have long been proposed to reduce friction and increase flow in liquid (e.g. crude oil) pipelines, see U.S. Pat. No. 4,527,581 and the good discussion of prior art drag reducers therein, which is incorporated herein by reference. However, there appears to have been little work done in the area of reducing drag in gas pipeline.

Early known techniques to increase flow in gas pipelines involved actually liquefying the gas before it flowing it into the pipeline, see U.S. Pat. No. 2,958,205. Others involved injecting additives, such as polymers, into the flowing gas stream to control emulsions, hydrates, and corrosion within the pipeline to increase the efficency of the pipeline operation; see FUNDAMENTALS OF PIPELINE ENGINEERING, Vincent-Genod, Gulf Publishing Co., Houston, TX, 1984, pps. 164 et sec, and U.S. Pat. No. 4,132,535 and the discussion of prior art therein.

The possibility of using drag reducers in gas pipelines was investigated and reported in "Flow of Natural Gas Through Experimental Pipe Lines and Transmission Lines", R.Y. Smith et al, Monograph 9, Bureau of Mines, Published by AMERICAN GAS ASSOCIATION, N.Y., N.Y., 1956. It was found that small amounts of liquid added to a gas in a "rough" pipeline could increase the flow capacity of the pipeline in a particular range of Reynolds numbers. It was surmised that "with a rough internal surface, the drops or ripples in the film of liquid probably dropped into the 'valleys' between the peaks of the roughness elements on the pipeline and created a surface that was smoother than the original surface of the pipeline" (see page 65 of report). However, the report reached the conclusion that the injection of liquids into a gas pipeline would be impractical for other reasons (see page 67 of report).

From the above, it can be seen that a need exists for a method by which the drag can be reduced in gas pipelines so that the gas flowrate at a constant pressure drop can be increased, thereby allowing smaller and/or fewer booster stations to be used along a particular pipeline to move the same volume of gas.

SUMMARY OF THE INVENTION

The present invention provides a method of reducing friction or drag for a gas, e.g. natural gas, for a gas flowing in a pipeline under a constant pressure drop between a first point (e.g. originating point) and a second point (booster station or terminus). A drag reducer is injected into the gas flow at the first point on the pipeline and the gas flowrate is monitored at the second point. The injection rate of the drag reducer is adjusted until a maximum flowrate for the gas is reached at the second point.

More specifically, the injection rate of the drag reducer is increased and/or decreased as the gas flowrate at the second point is monitored until a maximum flowrate is reached with the minimum amount of drag reducer required to establish the maximum flowrate. Also, the gas flow is routed through processing equipment at the second point to remove any drag reducer which may be present therein. The removed drag reducer at the second point is monitored and when the maximum gas flowrate at the second point is stabilized, the injection rate of drag reducer at the first point is substantially matched to the amount of drag reducer being removed at the second point.

"Drag reducer", as used herein, shall mean any material which when added to the flowing gas in the pipeline will increase the volumetric flowrate of the gas at a constant pressure drop without substantially changing the chemical composition of the gas, "e.g. glycols, alcohols, fatty acids, etc. The selected drag reducer will depend upon the actual conditions existing in a particular pipeline. The drag reducer is preferably injected at the first point as a liquid, gas, or is sprayed into the pipeline and has a vapor pressure whereby it will condense onto the wall of the pipeline at the temperatures and pressures of the gas flowing in the pipeline.

BRIEF DESCRIPTION OF THE DRAWINGS

The actual operation and apparent advantages of the present invention will be better understood by referring to the drawings in which like numerals identify like parts and in which.

BEST MODE FOR CARRYING OUT THE INVENTION

Figure 1:
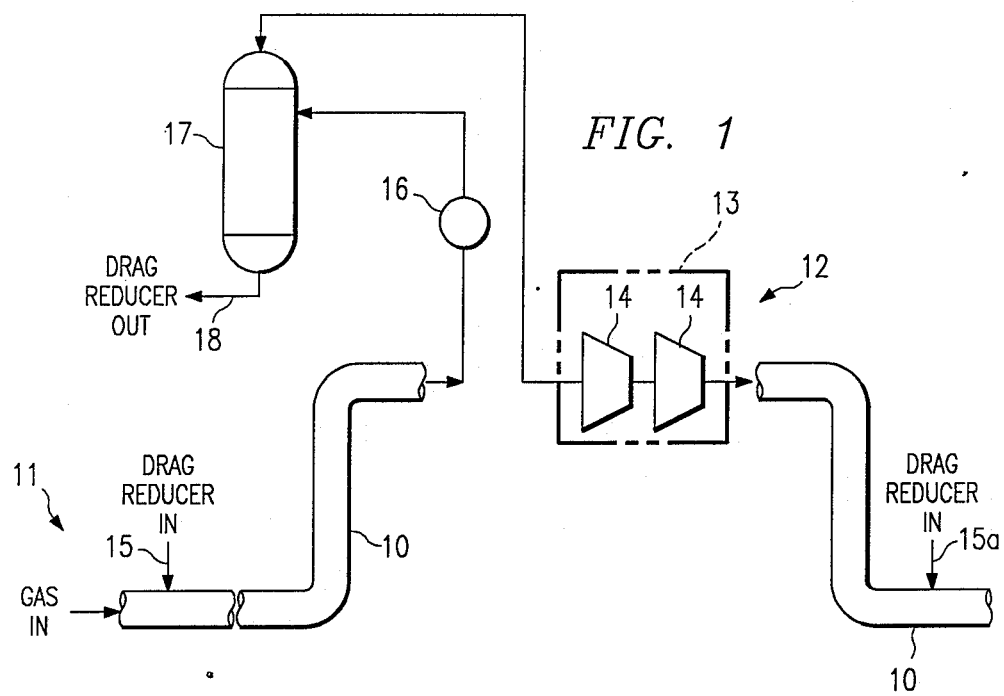
FIG. 1 is an illustration of a gas pipeline in which the present invention is used.

Referring more particularly to the drawings, FIG. 1 illustrates a section of a gas pipeline 10 which extends from a first point 11 to a second point 12. As will be understood, point 11 may be a remote location at which the gas, e.g. natural gas, is gathered and originally enters the pipeline 10 or it may be a point downstream of a booster station or it may be any point upstream from the terminus of the pipeline. Likewise, second point 12 may be the terminus of the pipeline or it may be at a booster station 13 (FIG. 1). Booster station 13 has one or more compressors 14 which receive the gas in pipeline 10 to boost the gas pressure back to or near that pressure which existed at first point 11, thereby compensating for the pressure drop experienced between points 11 and 12. While only one section of pipeline 10 has been shown in FIG. 1, it should be understood that an actual pipeline would likely include several such sections depending on the total length of the pipeline and the terrain over which it is laid.

In accordance with the present invention, gas is inputted into pipeline 10 at first point 11 at a constant pressure and temperature. It is understood that if point 11 is an originating point for the gas, the gas may be pretreated (e.g. filtered to remove solids, dehydrated to remove water, etc.) before it is input into line 10. As flow of the gas is established in line 10, a "drag reducer" is injected into the gas flow at the first point 11 through an inlet 15. As used herein, "drag reducer" shall mean any material which when added to the gas in pipeline 10 will increase the volumetric flowrate of the gas at a constant pressure drop without substantially changing the chemical composition of the gas. Specific examples of such materials will be discussed below.

As the gas arrives at second point 12, its flowrate is monitored through flowmeter 16 or the like. The drag reducer is continuously injected through inlet 15 while the gas flowrate is being monitored and the injection rate of the drag reducer is adjusted until a maximum gas flowrate is achieved for the constant pressure drop then existing between points 11 and 12. For example, the gas flowrate at point 12 is constantly monitored as the drag reducer is injected at a constant rate.. When the gas flowrate stabilizes at a value where it is no longer increasing, the injection rate of the drag reducer is increased to determine if the increased drag reducer will increase the gas flowrate further. When it becomes evident that no further increases in the drag reducer injection rate will not further increase the gas flowrate at the then constant pressure drop, the injection rate of the drag reducer is decreased until the gas flowrate begins to decrease. The drag reducer injection rate can be so manipulated until the maximum gas flowrate is achieved with the minimum amount of drag reducer.

Also, as shown in FIG. 1, the gas from pipeline 10 is routed through processing equipment 17 (e.g. condensers, separators, etc.) to remove any excess drag reducer which might be in the gas flow at second point 12 before the gas is delivered to compressors 14 The amount of drag reducer removed through outlet 18 from processing equipment 17 is continuously monitored and after the gas flowrate is stablized at the maximum, the drag reducer injection rate is adjusted to substantially match the drag reducer removal rate at the second point 12. In other words, the drag reducer injection rate is adjusted to provide the maximum gas flowrate at the then present constant pressure drop and then the injection rate is set to replenish the drag reducer at substantially the same rate as the drag reducer is lost during flow from first point 11 to second point 12. Of course, the drag reducer which is removed at point 12 can be transported back to point 11 and reinjected through inlet 15 or it can be used to make up the drag reducer required of the next section of pipeline 10 in which case it will be injected through inlet 15a which is downstream of compressors 14 at second point 12 and which now becomes the "first point" of the next section. The same procedure as described above is used to determine the injection rate of drag reducer to maximize the gas flow in each of the sections of the pipeline. Of course, if the pressure drop changes due to increasing or decreasing the horsepower of the gas compressors or the ambient temperatures changes, then the injection rate of the drag reducer may have to be changed using the same adjustment steps as set forth above.

Figure 2:
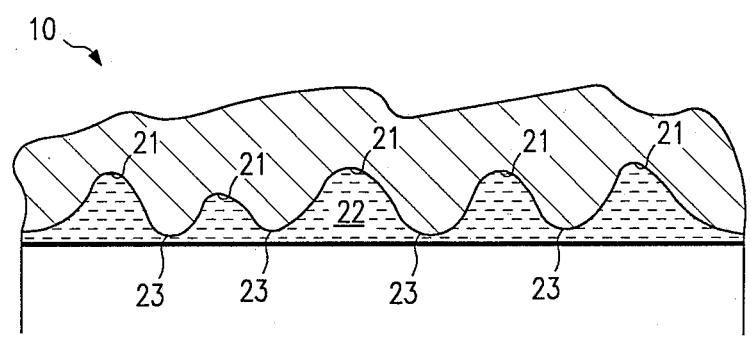
FIG. 2 is a sectional view, highly magnified, of a portion of a pipe wall showing the "roughness" of its internal surface.

Turning now to a more specific discussion, the internal surface of almost all, if not all, pipe used to constuct gas pipelines has a certain degree of "roughness" that contributes to the drag or friction on the gas that flows therethrough. For example, the internal surface of new, clean 48-inch pipe 10 (FIG. 2) used in Alaskan pipelines has been found to have imperfections or "valleys" 21 which have average depths of approximately 600 microinches. While these are microscopic in nature, experiments have indicated that these valleys and the corresponding "peaks" produce a roughness that seriously affect the flow of gas. The drag reducers used in the present invention form a thin film 22 on the internal surface of pipe 10 thereby effectively "filling" the valleys 21 to smooth out the surface of the pipe.

Preferably, the thickness of film 22 is approximately only slightly greater than the surface roughness of the pipe (e.g. 600 microinches). Any film thicker than this is likely to be wasteful since the excess will be swept away by the flowing gas and not only adds to the costs but also increases the pressure drop between the first and second points thereby decreasing the maximum gas flowrate which can be obtained. A thinner film, although providing some benefit, will not completely fill the valleys 21 and accordingly, pipe 10 will still have some roughness which will negatively affect the gas flowrate.

The drag reducer in the present invention is injected through inlet 15 preferably in a liquid, gas, or spray and is selected so that its vapor pressure is low enough where most of he drag reducer will condense out of the gas at the pressures and temperature within the pipeline and little will remain in a vapor phase to be swept along with the flowing gas. Further, the present drag reducer should have molecules whose diameters are small enough to fit into and fill the valleys 21 of pipe 10.

Several well known materials have the requirements necessary for use as the drag reducer in the present invention. Fortunately, many of these are also useful as corrosion inhibitors and dehydrators for gases so when used in the present invention, they serve multiple functions. Specific examples of such materials are glycols (e.g. ethylene glycol); alcohols (e.g. methanol); $C_4+$ hydrocarbons (e.g. propane); and fatty acids (e.g. oleic acid). The following table shows the equilibrium in parts per million (ppm) of several drag reducers in the gas phase at a pressure of 500 psia from which a particular drag reducer can be selected depending on the actual pipeline temperatures and pressures involved.

| DRAG REDUCER | Equilibruim ppms in gas phase at 500 psia | | | | |
|---|---|---|---|---|---|
| | −50° F. | 0° F. | +50° F. | +100° F. | +150° F. |
| Methanol | 44.4 | 395 | 2,283 | 9,653 | 32,220 |
| Ethanol | 11.5 | 133.3 | 955.7 | 4,820 | 18,643 |
| n-Propanol | 3.4 | 50.6 | 449.4 | 2,694 | 12,044 |
| Ethylene Glycol | 0.002 | 0.1 | 2.2 | 27.8 | 230.8 |
| Acetone | 122.0 | 765.6 | 3,340 | 11,202 | 30,802 |
| Propane | 33,175 | 83,950 | 172,060 | 326,823 | 545,561 |
| Butane | 5,225 | 17,647 | 46,539 | 104,830 | 205,205 |
| n-Pentane | 686.8 | 3,171 | 10,845 | 29,774 | 69,261 |
| n-Hexane | 109.8 | 676.8 | 2,919 | 9,695 | 26,448 |
| n-Heptane | 18.2 | 148.7 | 805.8 | 3,228 | 10,300 |
| n-Octane | 2.99 | 32.5 | 221.4 | 1,070 | 3,991 |
| n-Nonane | 0.46 | 6.59 | 56.4 | 329 | 1,434 |

As seen from the above, the present invention provides a method for reducing drag in a gas pipeline wherein it appears that as much as 15–40% increase of gas flow may be obtained in a pipeline over its otherwise capacity flowrate at the same constant pressure drop. This allows a pipeline to be built having (1) fewer booster stations along the same length of line or (2) increased throughput or (3) less horsepower requirements for each booster station or (4) thinner-walled line pipe since less line pressure is required to move the same volume of gas.

What is claimed is:

1. A method of reducing drag for a gas flowing in a pipeline between a first point and a second point, said method comprising:
   inputting gas at a constant pressure into said pipeline at said first point to establish gas flow in said pipeline between said first and second points;
   injecting a drag reducer into said gas flow at said first point;
   monitoring the flowrate of said gas at said second point; and
   adjusting the injection rate of said drag reducer at said first point until a maximum flowrate of said gas is reached at said second point.

2. The method of claim 1 wherein said step of adjusting said injection rate of said drag reducer comprises:
   increasing the injection rate of said drag reducer until said maximum flowrate of said gas is reached and remains constant;
   decreasing said injection rate of said drag reducer until said maximum flowrate of said gas begins to decrease; and
   adjusting said injection rate of said drag reducer by increasing and decreasing said injection rate until said gas flowrate is stabilized at said maximum flowrate.

3. The method of claim 1, including:
   removing any drag reducer in said gas flow at said second point.

4. The method of claim 3, including:
   monitoring the rate of drag reducer being removed from said gas flow at said second point after said gas flowrate has been stabilized at its maximum flowrate at said second point; and
   adjusting said injection rate of said drag reducer at said first point to be substantially equal to the removal rate of said drag reducer at the second point.

5. The method of claim 3, wherein said second point comprises a booster station having at least one compressor for boosting the pressure of the gas flow at said second point and wherein said drag reducer is removed from the gas flow at a point upstream of said at least one compressor.

6. The method of claim 5, including:
   injecting said removed drag reducer into said gas flow in said pipeline at a point downstream of said at least one compressor.

7. The method of claim 6, wherein said gas is comprised of natural gas.

8. The method of claim 7, wherein said drag reducer is a liquid which is sprayed into said gas flow.

9. The method of claim 7, said drag reducer has a vapor pressure whereby said drag reducer will condense at said temperatures and pressures within said pipeline.

10. The method of claim 7, wherein said drag reducer is selected from the group of gycols, alcohols, fatty acids, and $C_4+$ hydrocarbons.

* * * * *